Jan. 25, 1955
J. SNYDER
2,700,318
GUN MUZZLE BLAST AZIMUTH INDICATOR
Filed Oct. 3, 1951
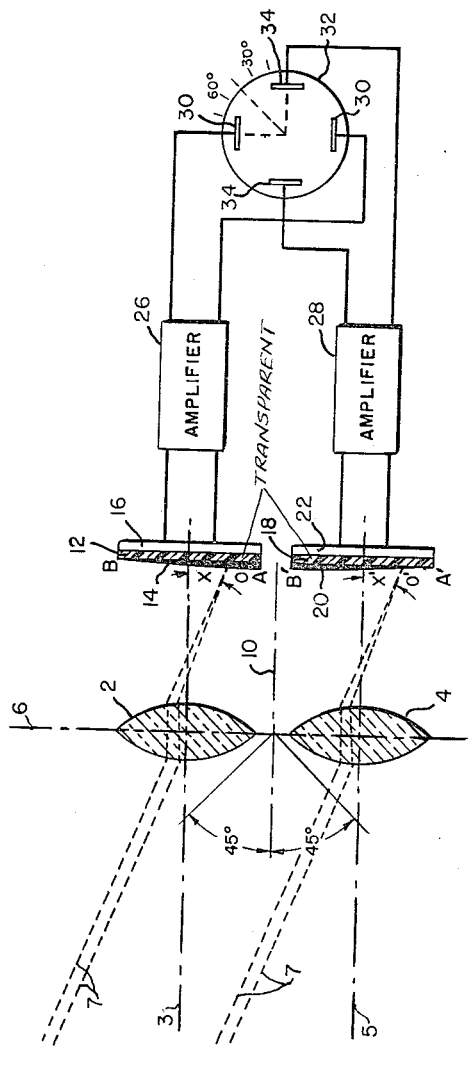
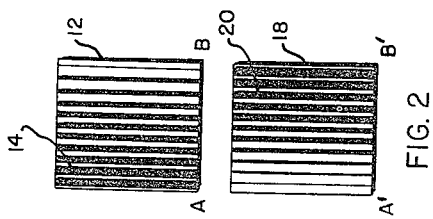
INVENTOR.
JAMES SNYDER
BY
Harry M. Saragovitz
Attorney

United States Patent Office 2,700,318
Patented Jan. 25, 1955

2,700,318

GUN MUZZLE BLAST AZIMUTH INDICATOR

James Snyder, Asbury Park, N. J., assignor to the United States of America as represented by the Secretary of the Army Application October 3, 1951, Serial No. 249,605

9 Claims. (Cl. 88—1)

(Granted under Title 35, U. S. Code (1952), sec. 266)

The invention described herein may be manufactured and used by or for the Government for governmental purposes, without the payment of any royalty thereon.

This invention relates to direction finding systems and more particularly to a system for locating gun positions by detecting the radiant energy resulting from the gun muzzle blast.

Gun direction finding systems by means of sound waves are well known. Experience has shown, however, that the accuracy of this method may be adversely affected under certain conditions. For example, the determination of direction by such a system may be greatly influenced by disturbing noises of various origins. Also, the nature of the surrounding terrain, wind, and weather conditions may adversely effect the accuracy in determining the azimuth of a gun blast by means of sound wave detection.

It is an object of the present invention to overcome the drawbacks and disadvantages inherent in the previous methods of direction finding using sound waves and to provide a novel method and system for direction finding which is both simple in construction and highly efficient and reliable in operation compared with the methods known in the prior art.

It is a further object of the present invention to provide an improved gun locating system utilizing a dual optical system for detecting muzzle blast radiation.

It is still a further object of the present invention to provide a direction finding system by means of detecting invisible infra-red or visible light from the muzzle blast radiation.

Still another object of the present invention is to provide a gun direction finder having two identical optical systems responsive to the radiant energy resulting from the muzzle blast.

In accordance with the invention, the gun direction finder comprises two identical optical systems, responsive to the radiation from a gun muzzle blast. Filter means are positioned at the rear focal plane of each optical system whereby the amount of radiant energy passing through each filter varies in a predetermined manner. Operatively associated with each filter is a photosensitive surface. The outputs of the two photosensitive surfaces are amplified and combined in an indicating system whereby the ratio of the outputs constitutes a measure of the azimuth angle of arrival of each muzzle blast radiation.

For a better understanding, the invention together with other and further objects thereof, reference is had to the following description taken in connection with the accompanying drawing in which:

Figure 1 is a schematic diagram of a dual optical system embodying the invention showing the relative position of the lenses and filters;

Figure 2 illustrates the variable coating on the filters utilized in Figure 1; and Figure 3 shows another form of filter.

Referring now to Figure 1 of the drawing, a dual optical system is provided by a pair of closely spaced lenses 2 and 4 of identical construction. The optical axes 3 and 5 of respective lenses 2 and 4 are preferably parallel and may be in the same horizontal plane, as shown in Figure 1. It is to be understood, of course, that optical axes 3 and 5 may be angularly displaced relative to each other. Lenses 2 and 4 may be adapted to converge the infra-red or visible light which may radiate from a muzzle blast source 8 and may be of the biconvex type as shown. Of course, it is to be understood that other lens types, such as the plano-convex, converging meniscus, parabolic mirror, or similar radiant energy converging means may be employed in the dual optical system. In general, the muzzle blast source may be considered to be at such a great distance from the lens system so as to constitute substantially a point source of radiant energy. The image of the muzzle blast in the focal plane of each lens may therefore be referred to as a point image.

Collimated rays 7 of radiant energy from a given azimuth position of muzzle blast source 8 are converged to a point on the respective rear focal plane of each lens in accordance with the basic principle of optics. If the angular elevation of muzzle blast source 8 is zero, the locus of the converging points at each of said focal planes is the line determined by the intersection of the horizontal plane passing through each optical axis and the respective focal plane of each lens. If there is any variation in the angular elevation of the muzzle blast source, the points of convergence will be either above or below the locus line. The horizontal displacement of the point of convergence along each of said loci at the respective focal plane is, of course, a function of the azimuth position of muzzle blast source 8 with respect to optical axis 10 of the lens system. For convenience, it is to be assumed the system is to be operatively limited to a mazimum angle of ±45° with respect to optical axis 10, or a total angular spread of 90°. It is to be understood, of course, that other suitable angular spreads may be employed.

At the rear focal plane of lens 2 and coplanar therewith there is provided a filter 12 having a coated surface 14 of variable denseness exposed to the converged radiant energy emanating from lens 2. Coated surface 14 is made sufficiently wide to compensate for variations in the angular elevation of the source 8 as mentioned above. The perviousness of exposed coated surface 14 is preferably made to vary horizontally from A to B as a successively increasing cosine function characteristic. Thus, as the point of convergence of the incident radiation moves along the exposed surface from A to B in accordance with the azimuth position of muzzle blast source 8, the amount of radiation passing through coated surface 14 of filter 12 successively increases a cosine function. Posterior filter 12 and coplanar therewith, there is provided a photosensitive surface 16 which is stimulated by the radiant energy passing through the coated surface of filter 12. Photosensitive surface 16 may comprise a lead sulfide cell or any other suitable material sensitive to radiant energy well known in the art.

In a similar manner, a filter 18 having a coated surface 20 of variable denseness exposed to the converged radiant energy emanating from lens 4 and a posteriorly mounted photosensitive surface 22 are provided at the rear focal plane of lens 4. The perviousness of exposed coated surface 20 is preferably made to vary horizontally from A′ to B′ as a successively decreasing cosine function characteristic. Thus, as the point of convergence of the incident radiation moves along the exposed surface from A′ to B′ in accordance with the azimuth position of muzzle blast source 8, the amount of radiation passing through coated surface 20 of filter 18 successively decreases as a cosine function. Photosensitive surface 22 is stimulated by the radiant energy passing through filter 18 and may comprise a lead sulfide cell or any other suitable material sensitive to radiant-energy. The output of photosensitive surfaces 16 and 22 is a function of the amount of radiant energy passing through coated surfaces 14 and 20 respectively. Filters 12 and 18 are shown in detail in Figure 2.

As shown, the outputs of photosensitive surfaces 16 and 22 are coupled respectively to identical amplifiers 26 and 28. The output of amplifier 26 is applied to the vertical plates 30 of cathode ray tube 32 and the output of amplifier 28 is applied to horizontal plates 34 of said cathode ray tube. If the face of the cathode ray tube is suitably calibrated, the resultant indication on indicator tube 32 will give linear measure of the angle of the muzzle blast source 8. It is to be understood of course that the denseness of the coated surfaces of filters 12 and 18 may be modified in such a manner as to vary the amount of radiant energy passing therethrough in any other suitable characteristic function and the face of the cathode ray tube may be calibrated in accordance with the function chosen to provide a manifestation of the azimuthal direction of said muzzle blast.

In operation, collimated radiant energy rays 7 from muzzle blast source 8 will converge at corresponding points O and O' on filters 12 and 18, as shown in Figure 1. The horizontal distances X and X' from the respective optical axis of lenses 2 and 4 to the point of convergence on the respective filters are equal, said distances being a function of the azimuth of the muzzle blast. The amount of radiation passing through filters 12 and 18 at converging points O and O' will be a function of the denseness of the surface coating on the respective filters at said points. Thus, photosensitive surfaces 16 and 22 will receive an amount of energy stimulus depending on the respective denseness of the coating at points O and O'. Since the outputs of both filters are made to give a cosine characteristic, the resultant indication on cathode ray tube 32 will produce a linear manifestation of the angle of arrival of the muzzle blast which is independent of the intensity of the radiated signal. Thus, the ratio of the outputs of photosensitive surfaces 16 and 22 constitute a measure of the azimuth angle of each muzzle blast radiation arrival.

If the incident radiant energy passing through lenses 2 and 4 is distorted into a vertical line, by means of a cylindrical lens system for example, other suitably shaped filters such as the triangular shaped filters 36 and 38, shown in Figure 3, may be substituted for the filters 12 and 18 shown in Figure 2.

While there have been described what at present are considered to be the preferred embodiments of the invention, it will be understood by those skilled in the art that various changes and modifications may be made herein without departing from the invention, and it is, therefore, aimed in the appended claim to cover all such modifications and changes as fall within the spirit and scope of the invention.

What is claimed is:

1. A system for determining the direction of arrival of radiant energy from a gun muzzle blast comprising in combination, a first and second radiant energy converging means disposed about a predetermined axis and each responsive to collimated rays of the radiant energy from said muzzle blast, a first filter positioned in the rear focal plane of said first converging means, said first filter having a surface of varying transmittance exposed to the radiant energy emanating from said first converging means, a first photosensitive surface posteriorly mounted to said first filter and stimulated by the radiant energy passing therethrough, a second filter positioned in the rear focal plane of said second converging means, said second filter having a surface of varying transmittance exposed to the radiant energy emanating from said second converging means, a second photosensitive surface posteriorly mounted to said second filter and stimulated by the radiant energy passing therethrough, said filters being respectively positioned with respect to said axis such that for any given azimuth position of said muzzle blast the discrete outputs of the respective surfaces of transmittance passing through to said photosensitive surfaces will have a prescribed ratio, and means responsive to the discrete outputs of said photosensitive surfaces for combining the output whereby the ratio of said discrete outputs constitute a measure of the angle of each muzzle blast with respect to the predetermined axis.

2. The claim set forth in claim 1 wherein said first and second radiant energy means comprise converging type lenses.

3. A system for determining the direction of arrival of radiant energy from a gun muzzle blast comprising in combination, a first and second converging lens responsive to collimated rays of radiant energy emanating from said muzzle blast and having axially aligned optical axes, a first filter mounted in the rear focal plane of said first lens and having a surface of varying transmittance exposed to the radiant energy emanating from said first lens, a photosensitive surface posteriorly mounted to said first filter stimulated by the radiant energy passing through said first lens, a second filter mounted in the rear focal plane of said second lens and having a surface of varying transmittance exposed to the radiant energy emanating from said second lens, a photosensitive surface posteriorly mounted to said second filter stimulated by the radiant energy passing through said second lens, said filters being respectively positioned with respect to said optical axes such that for any given azimuth position of said muzzle blast the discrete outputs of the respective surfaces of transmittance passing through to said photosensitive surfaces will have a prescribed ratio, and means responsive to the discrete outputs of said first and second photosensitive surfaces for combining the discrete outputs of said photosensitive surfaces whereby the ratio of said outputs constitutes a measure of the azimuth angle of each muzzle blast with respect to said optical axes.

4. The claim as defined in claim 3 wherein the transmittance of each of said coatings varies as a cosine function characteristic.

5. A system for determining the direction of the arrival of radiant energy from a gun muzzle blast comprising in combination, a first and a second radiant energy converging means disposed about a predetermined axis and responsive to collimated rays of said radiant energy for producing two discrete converged point images of incident radiant energy, a first and a second photosensitive means disposed respectively in the rear focal planes of said first and second radiant energy converging means, each of said photo-sensitive means having surface coatings of varying denseness exposed to said converged point images, the denseness of said coatings being so arranged that, as the point of convergence of said incident radiant energy moves along said surface coatings in a direction transverse to said focal planes, the amount of radiant energy passing through one of said photo-sensitive means decreases successively as a cosine function characteristic and the amount of radiant energy passing through the other of said coated surfaces increases successively as a cosine function characteristic, and means responsive to the discrete outputs of said first and second photo-sensitive means whereby the ratio of said discrete outputs constitutes a measure of the azimuth angle of said radiant energy with respect to said predetermined axis.

6. A system for determining the direction of arrival of radiant energy from a gun muzzle blast comprising in combination, a first and a second radiant energy converging means disposed about a predetermined axis and responsive to collimated rays of said radiant energy for producing two discrete converged point images of incident radiant energy, a first and a second filter disposed respectively in the rear focal planes of said first and second radiant energy converging means, each of said filters having a surface coating of varying denseness exposed to said converged point images, the denseness of said coatings being so arranged that, as the point of convergence of said incident radiant energy moves along said surface coatings in a direction transverse to said focal planes, the amount of radiant energy passing through one of said coated surfaces decreases successively as a cosine function characteristic and the amount of radiant energy passing through the other of said coated surfaces increases successively as a cosine function characteristic, a first photo-sensitive surface posteriorly mounted to said first filter and stimulated by the radiant energy passing therethrough, a second photo-sensitive surface posteriorly mounted to said second filter and stimulated by the radiant energy passing therethrough, and means for combining the outputs of each of said photo-sensitive surfaces whereby the ratio of the discrete outputs constitutes a measure of the azimuth angle of the muzzle blast with respect to said predetermined axis.

7. The device set forth in claim 6 wherein said first and second radiant energy converging means comprise converging type lenses.

8. The device set forth in claim 6 wherein said photosensitive surfaces comprise lead sulfide cells.

9. The system in accordance with claim 3 wherein said photosensitive surfaces comprise lead sulphide cells.

References Cited in the file of this patent

UNITED STATES PATENTS

| | | |
|---|---|---|
| 1,601,513 | Stoekle et al. | Sept. 28, 1926 |
| 2,016,036 | Fitz Gerald | Oct. 1, 1935 |
| 2,142,378 | Sachtleben | Jan. 3, 1939 |
| 2,288,430 | Bauman | June 30, 1942 |
| 2,421,012 | Chew | May 27, 1947 |
| 2,439,295 | Hammond et al. | Apr. 6, 1948 |
| 2,444,442 | Herbold | July 6, 1948 |
| 2,463,362 | Henri-Georges Doll | Mar. 1, 1949 |
| 2,489,220 | Herbold | Nov. 22, 1949 |
| 2,597,001 | Jaffee | May 20, 1952 |